United States Patent [19]

Hisamichi et al.

[11] Patent Number: 5,152,852
[45] Date of Patent: Oct. 6, 1992

[54] PNEUMATIC TIRE HAVING AN ASYMMETRIC TREAD WITH A SUBGROOVE APEX OFFSET FROM THE TREAD CENTER

[75] Inventors: Masaki Hisamichi, Chigasaki; Hirohisa Hazama; Shuichi Tsukada, both of Hiratsuka, all of Japan

[73] Assignee: The Yokohama Rubber Co., Ltd., Tokyo, Japan

[21] Appl. No.: 722,409

[22] Filed: Jun. 20, 1991

Related U.S. Application Data

[63] Continuation of Ser. No. 368,629, Jun. 20, 1989, abandoned.

[30] Foreign Application Priority Data

Jun. 22, 1988 [JP] Japan .................. 63-152167
Oct. 6, 1988 [JP] Japan .................. 63-250838

[51] Int. Cl.$^5$ .................................... B60C 11/03
[52] U.S. Cl. ........................ 152/209 A; 152/209 R
[58] Field of Search ............ 152/209 R, 209 D, 209 A

[56] References Cited

U.S. PATENT DOCUMENTS 4,732,194  3/1988  Saneto et al. .......... 152/209 A
4,877,072  10/1989  Fontaine ................. 152/209 A

FOREIGN PATENT DOCUMENTS 61-98601  5/1986  Japan .
52507  2/1989  Japan ................. 152/209 A Primary Examiner—Geoffrey L. Knable
Attorney, Agent, or Firm—Nikaido, Marmelstein, Murray & Oram

[57] ABSTRACT

A pneumatic tire having a tread comprising a plurality of straight-linear main grooves extending in the circumferential direction of the tire and a plurality of subgrooves extending to shoulder ends of the tire, crossing the main grooves at an inclination, wherein the subgrooves include in a central region of the width of a ground-contact area of the tread a curved portion which is convex in the direction of rotation of the tire and which is, in the condition of the tire of being mounted on a vehicle, located off the center of the width of the ground-contact area toward an outer side of the vehicle by a distance within a range of 5 to 15% of the width of the ground-contact area, and wherein subgrooves extending between the curved portion and the shoulder end on an outerside of the vehicle have an angle of inclination $\theta o$ relative to the circumferential direction of the tire, while subgrooves extendiing between the curved portion and the shoulder end on an inner side of the vehicle have an angle of inclination $\theta i$, the angles of inclination $\theta o$ and $\theta i$ having a $\theta o/\theta i$ ratio which is greater than 1.1 but is smaller than 1.5.

3 Claims, 5 Drawing Sheets

PNEUMATIC TIRE HAVING AN ASYMMETRIC TREAD WITH A SUBGROOVE APEX OFFSET FROM THE TREAD CENTER

This application is a continuation of application Ser. No. 368,629 filed Jun. 20, 1989, now abandoned.

BACKGROUND OF THE INVENTION:

The present invention relates to a pneumatic tire. More specifically, the invention relates to a pneumatic tire improved in or relating to both of the cornering performance on dry pavements (hereinafter referred to as the dry-condition cornering performance) and the water removing or repelling characteristic both in straight running service services and in cornering service of the tire on wet pavements (hereinafter referred to as the wet-condition performance).

It is known in the prior art to improve the dry-condition cornering performance by providing to tires a tread pattern which is asymmetric relative to the tread center. In greater detail, in order to attain the intended improvement, tires having such tread pattern are mounted on vehicles in a manner such that the side of the tire in which the groove area ratio on the tread surface is relatively small and the stiffness on the tread surface is relatively high is disposed at an outer side of the vehicles. This is because as follows: While in letting vehicles undergo a turning or cornering, the load on tires tend, due to the centrifugal force generated by the cornering of the vehicles, to concentrate on tires located on the side opposite to the side to which the vehicles are turned, the tread surface on the side of the tire having a relatively high stiffness can stand the concentration of load. However, a problem is indicated of the above tires such that upon cornering of vehicles on wet pavements, the water repelling characteristic lowers in the tread region having a relatively small groove area ratio.

Japanese patent application Kokai publication No. 61-98601 proposes to attain an improvement in or relating to the water removing characteristic upon cornering, by providing a tire having a fletch- or herringbone-type tread pattern which comprises a plurality of straight-linear main grooves extending in the circumferential direction of the tire and a plurality of subgrooves bridging the main grooves and extending toward shoulder ends of the tire and in which the subgrooves include an angled or a curved portion convex in the direction of rotation of the tire, the tire being mounted on a vehicle with the angled or curved portion of sub- grooves disposed on an outer side of the vehicle. This tire can exhibit an improved wet-condition performance not only upon cornering or turning but also in straight running of vehicles. However, it has been impossible to obtain a satisfactory dry-condition cornering performance by way only of providing a herringbone-type tread pattern such as above.

BRIEF SUMMARY OF THE INVENTION:

Objects of the present invention center upon providing a pneumatic tire improved in or relating to both of the wet-condition performance in straight running and upon cornering and the dry-condition cornering performance, substantially solely by way of providing a novel tread pattern to the tire.

The pneumatic tire to attain the above object according to the invention has a fletch- or herringbone-type tread pattern which comprises a plurality of straight-linear main grooves extending in the circumferential direction of the tire and a plurality of subgrooves bridging the main grooves and extending to the shoulder ends of the tire and in which the subgrooves have in a central region of the width of the ground-contact area of the tread a v-shaped angled or a curved portion convex in the direction of rotation of the tire. This tire is structured so that when it is mounted on a vehicle, an apex of the angled or curved portion in the subgrooves is located off the center of the contact area width toward an outer side of the vehicle by a distance within a range of 5 to 15% of the contact area width of the tread. Also, it is designed that sub-grooves extending between the apex of the v-shaped angled or curved portion and the shoulder end on an outer side of the vehicle have an angle of inclination $\theta o$ relative to the tire circumferential direction, while subgrooves extending between the angled or curved portion and the shoulder end on an inner side of the vehicle have an inclination angle $\theta i$ also relative to the tire circumferential direction, and that the angles of inclination $\theta o$ and $\theta i$ have a $\theta o/\theta i$ ratio which exceeds 1.1 but does not reach 1.5.

Figure 1:
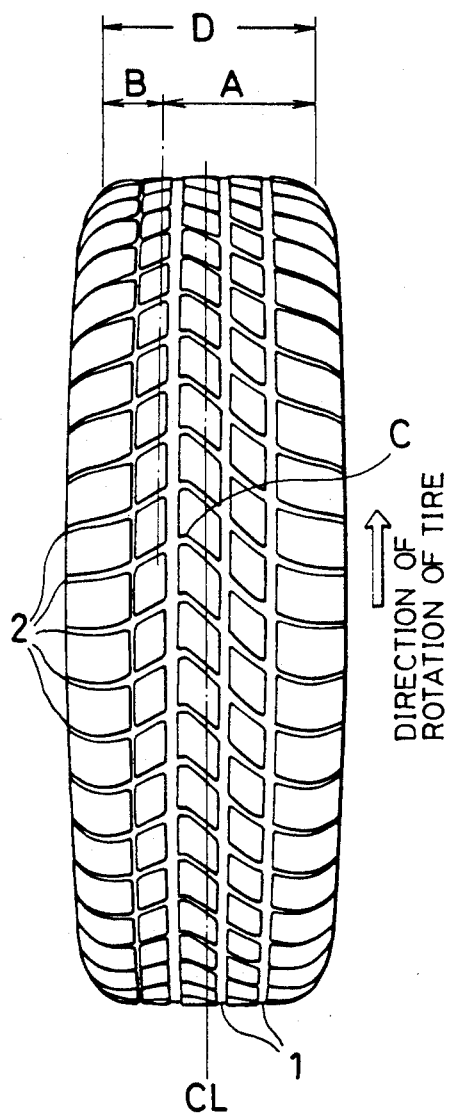
FIG. 1 shows a front elevation of a pneumatic tire for mounting on a left-side wheel of a vehicle, according to the present invention.
Figure 2:
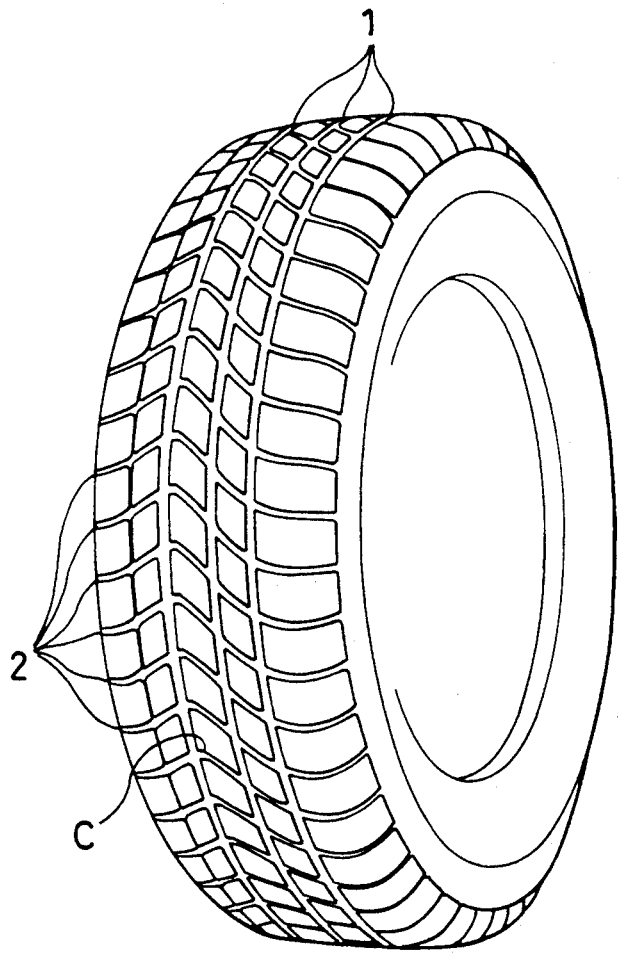
FIG. 2 is a perspective view of the tire of FIG. 1.
Figure 3:
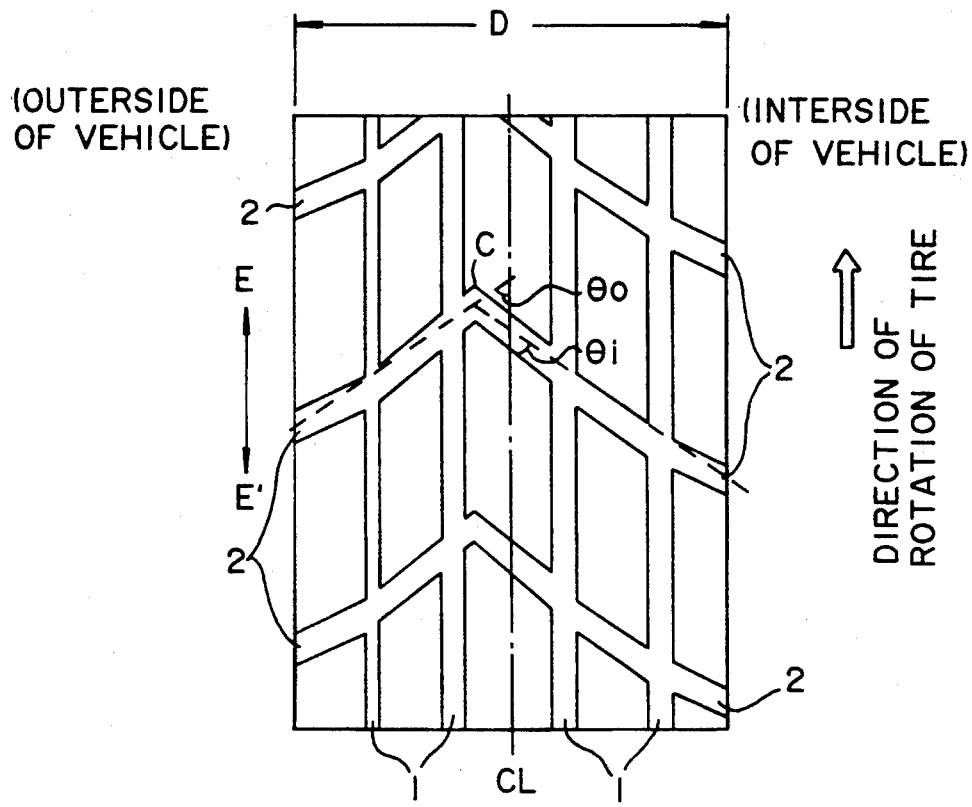
FIG. 3 shows a partial plan view, taken for illustration of the tread pattern of the tire according to the invention.

DETAILED DESCRIPTION OF THE PREFERRED EMBODIMENT:

As illustrated in FIGS. 1, 2 and 3, the pneumatic tire according to the present invention has a tread pattern which comprises a plurality of straight-linear main grooves 1 extending in the circumferential direction of the tire E-E' and a plurality of subgrooves 2 bridging or connecting the main grooves 1 to one another and extending to the shoulder ends of the tire. This tread pattern comes under a fletch- or herringbone-type one in that the subgrooves 2 have, in a central region of the width D of the ground-contact area of the tread, v-shaped or curved portions c which are convex in the direction in which the tire is to be rotated. The v-shaped portions c in the subgrooves 2 are arranged so that in the condition of the tire of being mounted on a vehicle, they are located off the center CL of the contact area width D of the tread toward an outer side of the tire by a distance within a range of 5 to 15% of the contact area width D. It is not always necessary that the curved v-shaped portions c are disposed in alignment with a main groove 1, and they may be in an offset arrangement as best seen from FIGS. 1 and 3.

Subgrooves 2 extend toward the left or the right shoulder end, crossing main grooves 1 at an inclination and depicting either straight lines or moderately curved lines. In the embodiment shown in FIGS. 1 and 2, the subgrooves 2 are formed to comprise a moderately curved line. The angle of inclination $\theta o$ of the subgrooves 2 extending between the v-shaped portion c and the shoulder end of the tire on an outer side of a vehicle, relative to the tire circumferential direction E-E', is set to exceed the comparable angle $\theta i$ of the subgrooves 2 extending between the v-shaped portion c and the shoulder end of the tire on an inner side of the vehicle, also relative to the tire circumferential direction E-E'. More specifically, it is set that the ratio of the inclination angles $\theta o$ to $\theta i$, $\theta o/\theta i$, exceeds 1.1 but does not reach 1.5.

According to the present invention, the inclination angles $\theta o$ and $\theta i$ mean as follows: Where subgroove segments between v-shaped portion c and shoulder ends are straight linear segments which form a moderately curved subgroove 2, the angle $\theta o$ is the angle taken by a straight line depicted to connect together the center of a subgroove at the v-shaped portion c and the center of the subgroove at the shoulder end on the outer side of a vehicle, relative to the tire center line CL, and a same as this applies to the angle $\theta i$ except that the shoulder end is in this case on the inner side of the vehicle.

Figure 10:
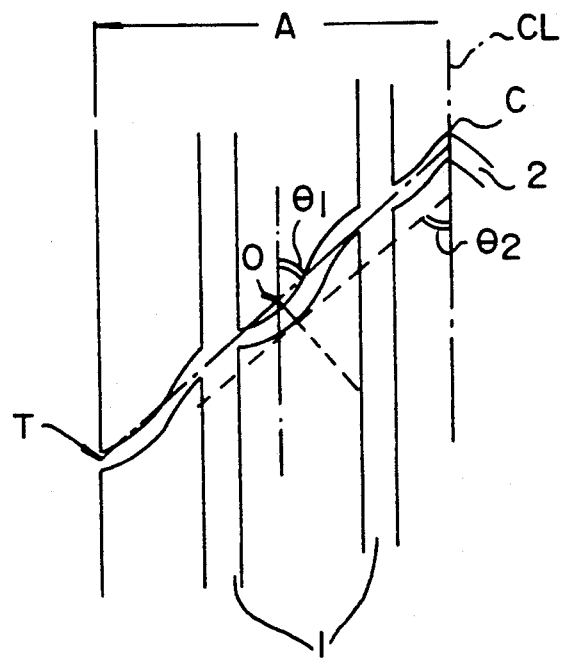
FIG. 10 shows a partial plan view, taken for an explanation of the inclination angles in the case of a tread pattern in which subgrooves comprise a curved one.

Then, where subgrooves comprise curved ones, as shown in FIG. 10, the angle $\theta o$ means $\frac{1}{2}$ of the sum of an angle $\theta 1$ taken by a first straight line (shown by a dot-dash line in FIG. 10) depicted to connect together the center of a subgroove at the v-shaped portion and the center of the subgroove at the shoulder end T on the outer side of the vehicle, relative to the tire center line CL, and an angle $\theta 2$ to the center line CL of the tangent (shown by a broken line in FIG. 10) at the point at which a straight line (imaginary line shown by a two-dot-dash line in FIG. 10) perpendicular to the first straight line (dot-dash-line) at the middle point O (one-half length) of the first straight line crosses the convex portion of subgroove 2. A same as above applies to the angle $\theta i$ except that the shoulder end is in this case on the inner side of the vehicle.

The width D of the ground-contact area of the tread means the footprint width at the inflation pressure and under a load of 80% of the maximum load prescribed in the standards defined by JATMA (Japan Automobile Tire Manufactures Association).

For purposes of the present invention, it is required that the angled or v-shaped portions c in the subgrooves 2 are formed off the tread center CL by a distance within a range of 5 to 15% of the contact area width D. According to this arrangement of the v-shaped portions c in the tread or tread pattern, it is possible to let the tire exhibit a remarkable water repelling characteristic not only when the tire is run straight but also when it is cornered at a slip angle of 2° to 4°, on wet road surfaces.

Figure 4:
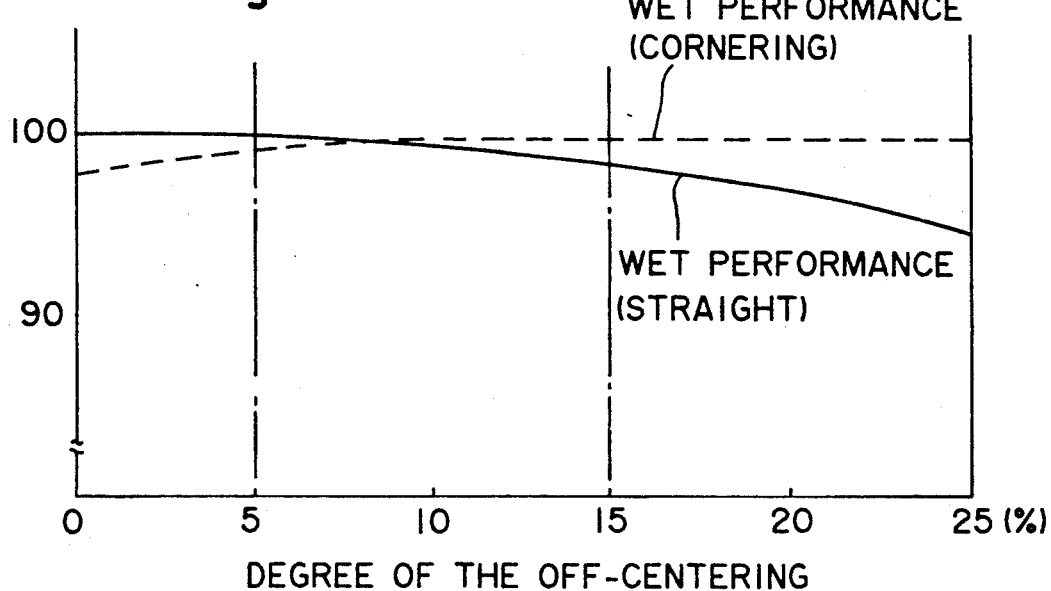
FIG. 4 is a graph, showing the relationship between the position of the v-shaped or curved portion of subgrooves in a tire having a herringbone-type tread pattern and the wet-condition performance.

In connection with the above tire performance, FIG. 4 shows empirically ascertained facts in the form of a graph, and it enters the data determined of tires having subgrooves of $\theta i=50°$, $\theta o=60°$ and $\theta o/\theta i=1.2$ and having different degrees of the off-centering of the v-shaped portion c relative to the tread center CL, on water repelling characteristics when the tires were run straight and that when the tires were cornered (wet-condition performances). Further, in FIG. 4, the wet-condition performances are shown by indices obtained by taking as 100 the water repelling characteristic value found of a tire having a value of 0 (zero) for the degree of off-centering of the v-shaped portions c in subgrooves relative to the tread center L, when this tire was run straight.

As seen from FIG. 4, tires having a degree of the off-centering of the v-shaped portion c within a range of 5 to 15% of the contact area width D of the tread can exhibit an improved water repelling characteristic at the time of cornering of the tire, without a considerable sacrifice caused to the comparable characteristic at the time of straight running, in comparison to tires having a degree of the off-centering outside the above range.

Figure 6:
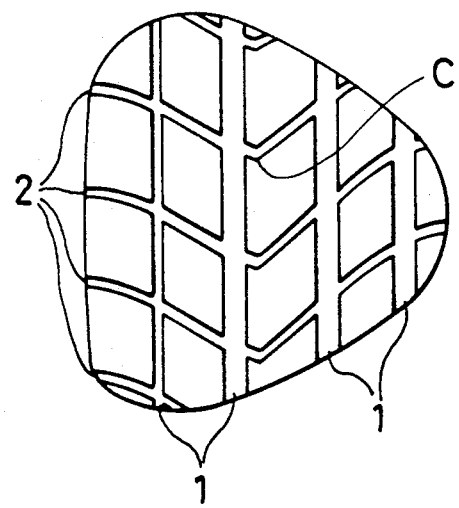
FIG. 6 and FIG. 7 each show a tread pattern printed on a pavement, of a tire mounted on a vehicle.
Figure 7:
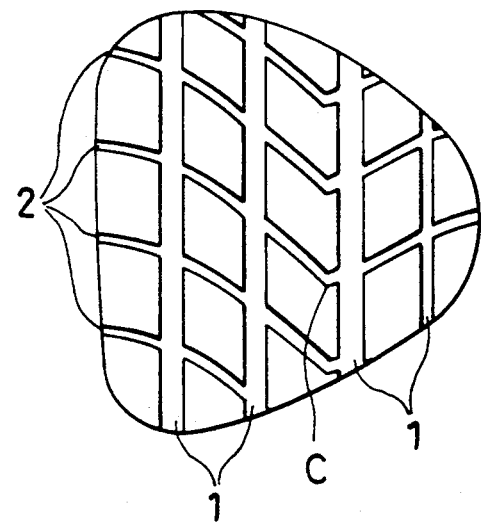

The reason for why tires having v-shaped portions c in an off-center arrangement as above shows a desirable water removing characteristic in cornering services on a wet pavement as above can be known with reference to FIGS. 6 and 7, which were taken when tires according to the present invention were mounted on an inner and an outer sides of a vehicle and the vehicle was then cornered to the right at a slip angle of 2° and a camber angle of 2°. While FIG. 6 shows the tread pattern printed on a pavement by a tire on the left side of the vehicle, FIG. 7 shows the tread pattern printed by a tire on the right side of the vehicle. When the vehicle is turned to the right, the load on the tires moves toward left due to the centrifugal force generated by the turning of the vehicle, so that the tread contacts the ground or pavement surface in a state of being compressed toward a left half area portion thereof. The degree of compression of the tread is more conspicuous with the tire on the left side of the vehicle than the tire on the other vehicle side. Therefore, the V-shaped portions c in the subgrooves 2 in the left-side tire come to be located about the center of the tread pattern as shown in FIG. 6, so that removal of water can smoothly take place toward the left and the right sides of the V-shaped portions c, whereby a desirable effect of water removal can be obtained. On the other hand, the right-hand tire prints a tread pattern as shown in FIG. 7, in which the V-shaped portions c in the subgrooves 2 are not located about the center of the tread pattern but are deviated from the tread pattern center. However, as before indicated, the load application is relatively limited on the right-hand tire, so that the influence of the water repelling characteristic of the right-hand tire on the wet-condition cornering performance does not tend to be so great as in the case of the left-hand tire.

Then, when the vehicle is cornered to the left, the above described relation of tread patterns shown in FIGS. 6 and 7 is reversed, and same results as described above in the case of cornering of the vehicle toward the right can be obtained.

According to the invention, it is also required, in addition to arranging the V-shaped portions c as above, to meet that the ratio, $\theta o/\theta i$, of the inclination angle $\theta o$ of subgrooves extending between the V-shaped portion c and the shoulder end on an outer side of the vehicle to the comparable angle $\theta i$ of subgrooves extending between the V-shaped portion c and the shoulder end on an inner side of the vehicle is greater than 1.1 but is smaller than 1.5. According to the above arrangement, blocks located on an outer side of the vehicle can have a greater rigidity to lateral forces than blocks located on an inner side of the vehicle, so that the dry-condition cornering performance can be improved, and yet this can be attained without lowering the wet-condition performance at any considerable extent.

Figure 5:
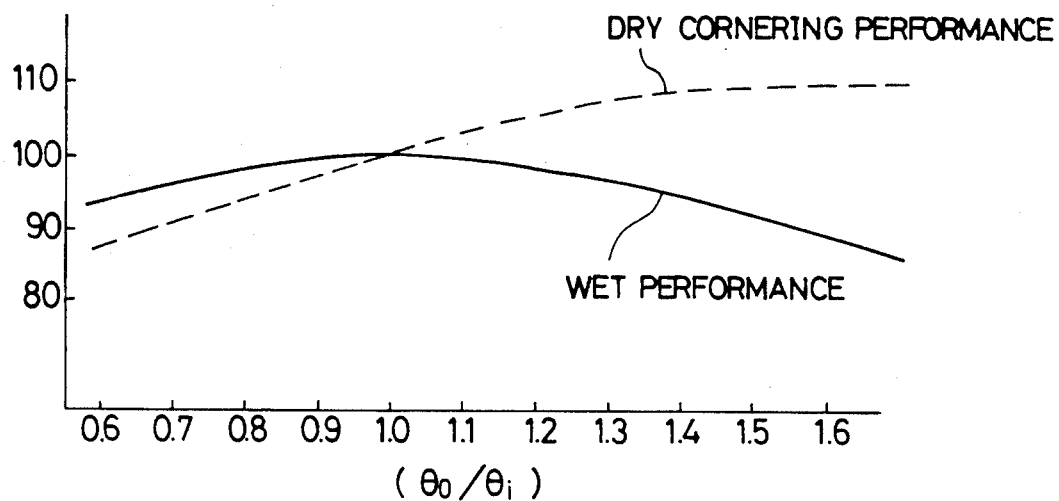
FIG. 5 is a graph, showing the relationship between the $\theta o/\theta i$ ratio, of the inclination angle $\theta o$ of a subgroove to the inclination angle $\theta i$ of another subgroove relative to the tire circumferential direction, on the one hand, and the dry-condition cornering performance and the wet-condition performance, on the other hand.

FIG. 5 shows the data on the dry-condition cornering performance and the wet-condition performance, determined of tires having 8% of the contact area width D of the tread for the degree of off-centering of the curved portions c in subgrooves 2 from the tread center CL to an outer side of a vehicle and having different $\theta o/\theta i$ ratio. In FIG. 5, the dry-condition cornering performance values and the wet-condition performance values are shown by indices (performance indices) obtained by taking as 100 the comparable values found of a tire having a value of 1.0 for the above $\theta o/\theta i$ ratio.

From FIG. 5, it is seen that tires having a $\theta o/\theta i$ ratio lying within the range of 1.1 to 1.5, both exclusive, can exhibit a remarkably improved dry-condition cornering performance maintaining a certain level of the wet-condition performance substantially unchanged, when compared with tires having a $\theta o/\theta i$ ratio not lying within the above range.

According to the present invention, further, it is contemplated to suppress the degree of discontinuity between blocks and grooves and yet maintain the wet-condition performance to be as high as possible, and also to let the tire exhibit a desirable dry-condition cornering performance and a high block rigidity, and to this end, preferably it should be met that the groove area ratio b in a contact region shown at B in FIG. 1, in a width portion of from 20 to 30%, both inclusive, of the contact area width D of the tread, measured from the outside end of the contact area of the tread, is within a range shown by $b/a \leq 0.8$, in which a is the groove area ratio in a contact region A of the width portion obtained by deducting the width portion of the contact region B from the contact area width D.

It is particularly preferable if the groove area ratio b in the contact region B is less than 30%.

The above groove area ratios a and b mean ratios in percentage (%) of groove areas to the sum of the contact area and the groove area in the contact regions A and B.

According to the below described specification, there were built four different tires, a Tire I of the Invention and Comparative Tires I, II and III, of a common tire size of 205/60R15 89H, and there were then conducted evaluations of the tires with respect to their dry-condition cornering performances and their wet-condition performances represented by the wet-condition cornering performance and the wet-condition straight running performance, according to the following described method, to obtain results as shown in the below Table 1.

Method of Evaluations: Using rims of a size of 15×6JJ, the tires were mounted on four-wheel cars of Japanese origin, and under the conditions of an inflation pressure of 2.1 kgf/cm$^2$ and a running velocity of 60 km/hour, running tests of the tires on actual cars were operated to determine each of the wet-condition straight running performance, the wet-condition cornering performance and the dry-condition cornering performance by a feeling evaluation method. Further, the tires were mounted on the cars with the convexity of the V-shaped curved portions c in subgrooves arranged to correspond to the direction of rotation of tires and located on an outer side of the cars.

The performance data found are shown in terms of indices with the data found of the Comparative Tire II taken as 100, and larger indices mean more desirable results, applicable to both of the dry-condition performance and the wet-condition performance.

Tire of the Invention I:

tread pattern: the one shown in FIG. 3.
$\theta o = 60°$, $\theta i = 50°$, and $\theta o/\theta i$ ratio = 1.2.
degree of off-centering of V-shape portions in subgrooves [in percentage (%) to the contact area width D of the tread]: 8%.
the contact area width D of the tread: 150 mm.
the groove area ratio b in the contact region B of a width of 30% of the contact area width D of the tread, measured from the shoulder end on an outer side of the vehicle: 25%.
the groove area ratio a in the contact region A: 35%.
b/a = 0.71.

Figure 8:
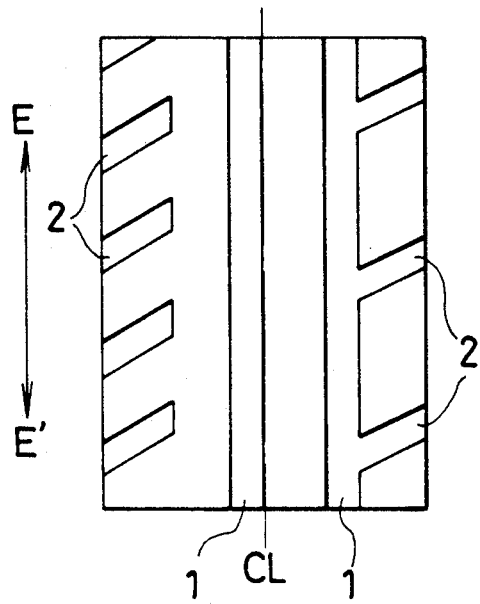
FIG. 8 and FIG. 9 each show a tread pattern of a comparative tire.
Figure 9:
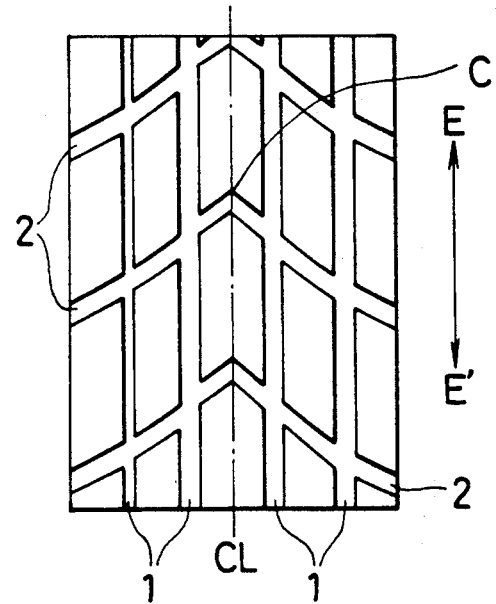

Comparative Tire I:

tread pattern: the one shown in FIG. 8.
contact area width D of the tread, and the groove area ratios a and b: same as in the above Tire of the Invention I Comparative tire II:

tread pattern: the one shown in FIG. 9.
$\theta o$, $\theta i$ and $\theta o/\theta i$ ratio: same as in the Tire of the Invention I.
degree of off-centering of V-shaped portions in subgrooves [in percentage (%) to the contact area width D of the tread]: 0%.
contact area width D of the tread: 150 mm.
contact region B: 45 mm.
groove area ratio b: 35%.
groove area ratio a: 35%.
b/a: 1.0.

Comparative Tire III:

tread pattern: the one shown in FIG. 9.
$\theta o$, $\theta i$ and $\theta o/\theta i$ ratio: same as in the Tire of the Invention I.
degree of off-centering of V-shaped portions in subgrooves [in percentage (%) to the contact area width D of the tread]: 0%.
contact area width D of the tread: 150 mm.
contact region B: 45 mm. groove area ratio a: 35%.
groove area ratio b: 25%.
b/a: 0.71.

TABLE 1

|  | Comparative Tires | | | Tire of the Invention |
| --- | --- | --- | --- | --- |
|  | I | II | III | I |
| groove area ratio b | 25% | 35% | 25% | 25% |
| groove area ratio a | 35% | 35% | 35% | 35% |
| b/a | 0.71 | 1 | 0.71 | 0.71 |
| degree of off-centering | — | 0 | 0 | 8% |
| dry-condition cornering performance | 105 | 100 | 105 | 105 |
| wet-condition cornering performance | 96 | 100 | 98 | 107 |
| wet-condition straight running performance | 96 | 100 | 100 | 99 |

From the above Table 1, it is seen that the Tire of the invention I has a wet-condition straight running performance which is substantially comparable to those of the Comparative Tires II and III, a dry-condition cornering performance which is comparable to those of the Comparative Tires I and III and exceeds the performance of the Comparative Tire II, and a wet-condition cornering performance which greatly exceeds those of Comparative Tires I, II and III.

Further, there were also built three different further tires, Tire of the Invention II and Comparative Tires IV and V, all of which corresponded to the above described Tire of the Invention I except that the angles of inclination $\theta o$ and $\theta i$ of V-shaped portions c in subgrooves 2 relative to the tire circumferential direction and the $\theta o/\theta i$ ratio were modified as shown in the below Table 2, and same evaluations as above of the present tires with respect to their dry-condition cornering performances, wet-condition straight running performances and wet-condition cornering performances were conduted, to obtain results shown also in Table 2 below in terms of indices taking as 100 the evaluation values found of the Comparative Tire IV. Further, in Table 2, the wet-condition straight running performances and wet-condition cornering performances are shown in terms of wet-condition performance.

TABLE 2

|  | Comparative Tire IV | Tire of the Invention II | Comparative Tire V |
|---|---|---|---|
| $\theta o$ | 55° | 65° | 90° |
| $\theta i$ | 55° | 55° | 55° |
| $\theta o/\theta i$ | 1.0 | 1.2 | 1.5 |
| dry-condition cornering performance | 100 | 107 | 110 |
| Wet-condition performance | 100 | 100 | 93 |

From the above Table 2, it is seen that the Tire of the Invention II has a wet-condition performance and a dry-condition cornering performance each of which is remarkable, that with respect to the wet-condition performance, the Comparative Tire V is considierably inferior to both of the Tire of the Invention II and the Comparative Tire IV, and that with respect to the dry-condition cornering performance, the Comparative Tire IV is considerably inferior to both of the Tire of the Invention II and the Comparative Tire V.

What is claimed is:

1. A pneumatic tire having a tread comprising a plurality of straight-linear main grooves extending in the circumferential direction of the tire and a plurality of subgrooves extending to shoulder ends of the tire, crossing the main grooves at an inclination, wherein the subgrooves include in a central region of the width of a ground-contact area of the tread a V-shaped portion which is convex in the direction of rotation of the tire and which has in the condition of the tire of being mounted on a vehicle, an apex located off the center of the width of the ground-contact area toward an outer side of the vehicle by a distance within a range of 5 to 15% of the width of the ground-contact area, and wherein subgrooves extending between the apex of the V-shaped portion and the shoulder end on an outer side of the vehicle have an angle of inclination $\Theta_o$ relative to the circumferential direction of the tire, while subgrooves extending between the apex of the V-shaped portion and the shoulder end on an inner side of the vehicle have an angle of inclination $\Theta_i$, the angles of inclination $\Theta_o$ and $\Theta_i$ having a $\Theta_o/\Theta_i$ ratio which exceeds 1.1 but does not reach 1.5.

2. A pneumatic tire as claimed in claim 1, wherein the subgrooves comprise a moderately curved line.

3. A pneumatic tire as claimed in claim 1, wherein the apex of the V-shaped portion in the subgrooves is laterally offset from the main grooves.

* * * * *